[11] 3,772,649
[45] Nov. 13, 1973

[54] DATA INTERFACE UNIT FOR INSURING THE ERROR FREE TRANSMISSION OF FIXED-LENGTH DATA SETS WHICH ARE TRANSMITTED REPEATEDLY

[75] Inventors: Donald E. Haselwood, Deerfield; Carl M. Solar, Glenview, both of Ill.

[73] Assignee: A. C. Nielsen Company, Chicago, Ill.

[22] Filed: Feb. 17, 1972

[21] Appl. No.: 227,060

Related U.S. Application Data

[62] Division of Ser. No. 15,696, Mar. 2, 1970, Pat. No. 3,651,471.

[52] U.S. Cl. .......... 340/146.1 BA
[51] Int. Cl. .......... G08c 25/02, H04l 1/08
[58] Field of Search .......... 340/146.1 BA; 178/23 A

[56] References Cited

UNITED STATES PATENTS

| | | | |
|---|---|---|---|
| 3,676,846 | 7/1972 | Busch | 340/146.1 BA |
| 3,618,017 | 11/1971 | Murayama | 340/146.1 BA |
| 3,402,389 | 9/1968 | Koontz | 340/146.1 BA |
| 3,252,139 | 5/1966 | Moore | 340/146.1 BA |

*Primary Examiner*—Charles E. Atkinson
*Assistant Examiner*—David H. Malzahn
*Attorney*—Richard D. Mason et al.

[57] ABSTRACT

A data interface unit is designed to receive fixed-length data sets which are transmitted repeatedly and which differ from one another only in the reversal of a single data bit between successive transmissions. The data interface unit stores all the bits comprising a first transmitted data set and then compares each of the data bits in the set to the corresponding bit in a subsequently transmitted data set. When a first disagreement between transmitted data bits is found, that disagreement is assumed to be the bit that was reversed in sign and is also assumed to be the start of the data. If all of the bits save that one bit are the same during both transmissions, then an error-free transmission is assumed to have occurred and the data set is accepted. However, if two or more data-bit positions are found to disagree, then the transmission is known to contain at least some errors. The data storage and comparison process is then repeated using subsequent transmissions of the data set. This data interface unit is particularly suitable for collecting data from remote locations over conventional telephone lines with the assistance of automatic dialing equipment. The preferred embodiment of the invention is designed for use in carrying out surveys of the listening habits of television viewers.

3 Claims, 7 Drawing Figures

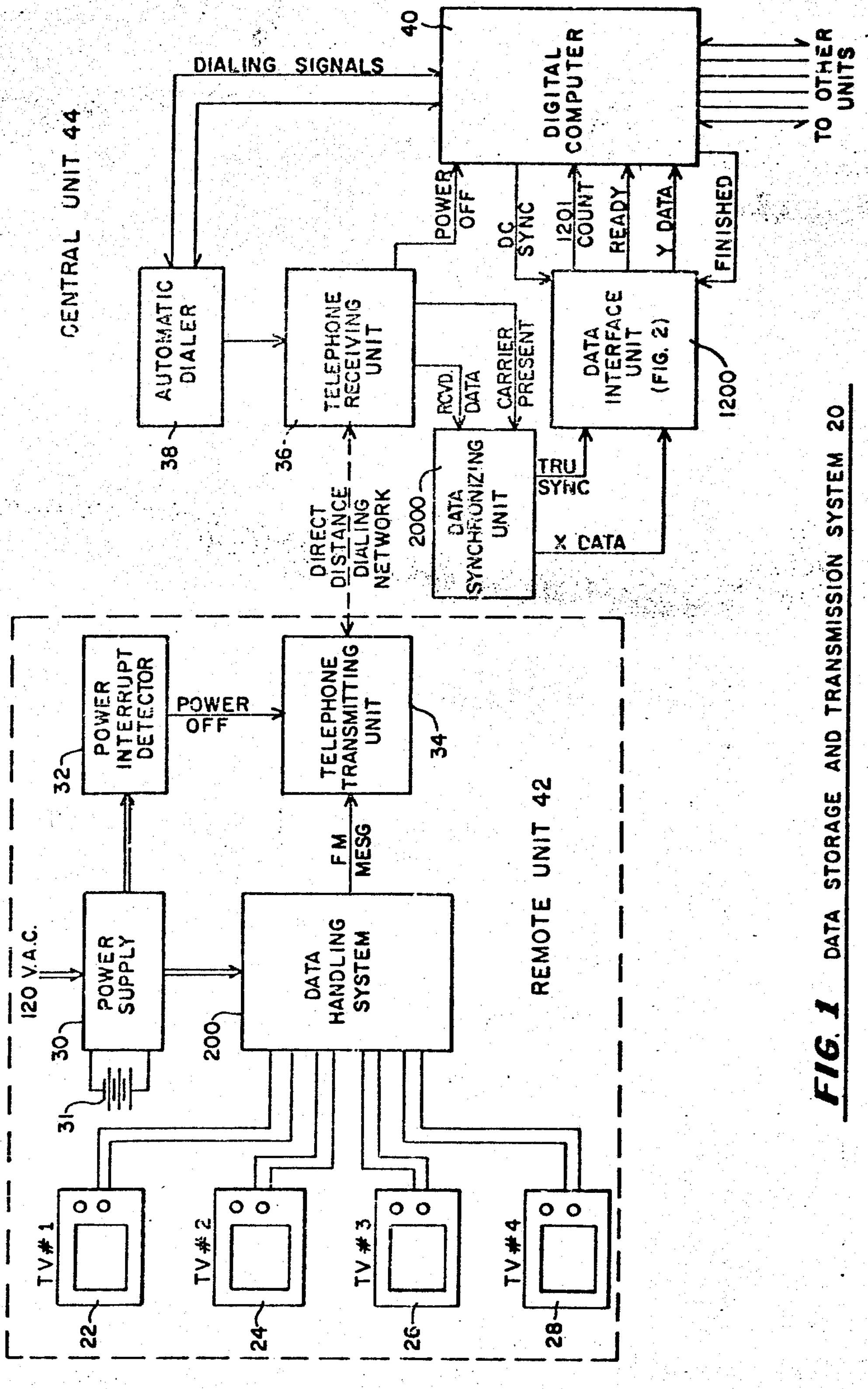
FIG. 1 DATA STORAGE AND TRANSMISSION SYSTEM 20

FIG. 2 DATA INTERFACE UNIT 1200
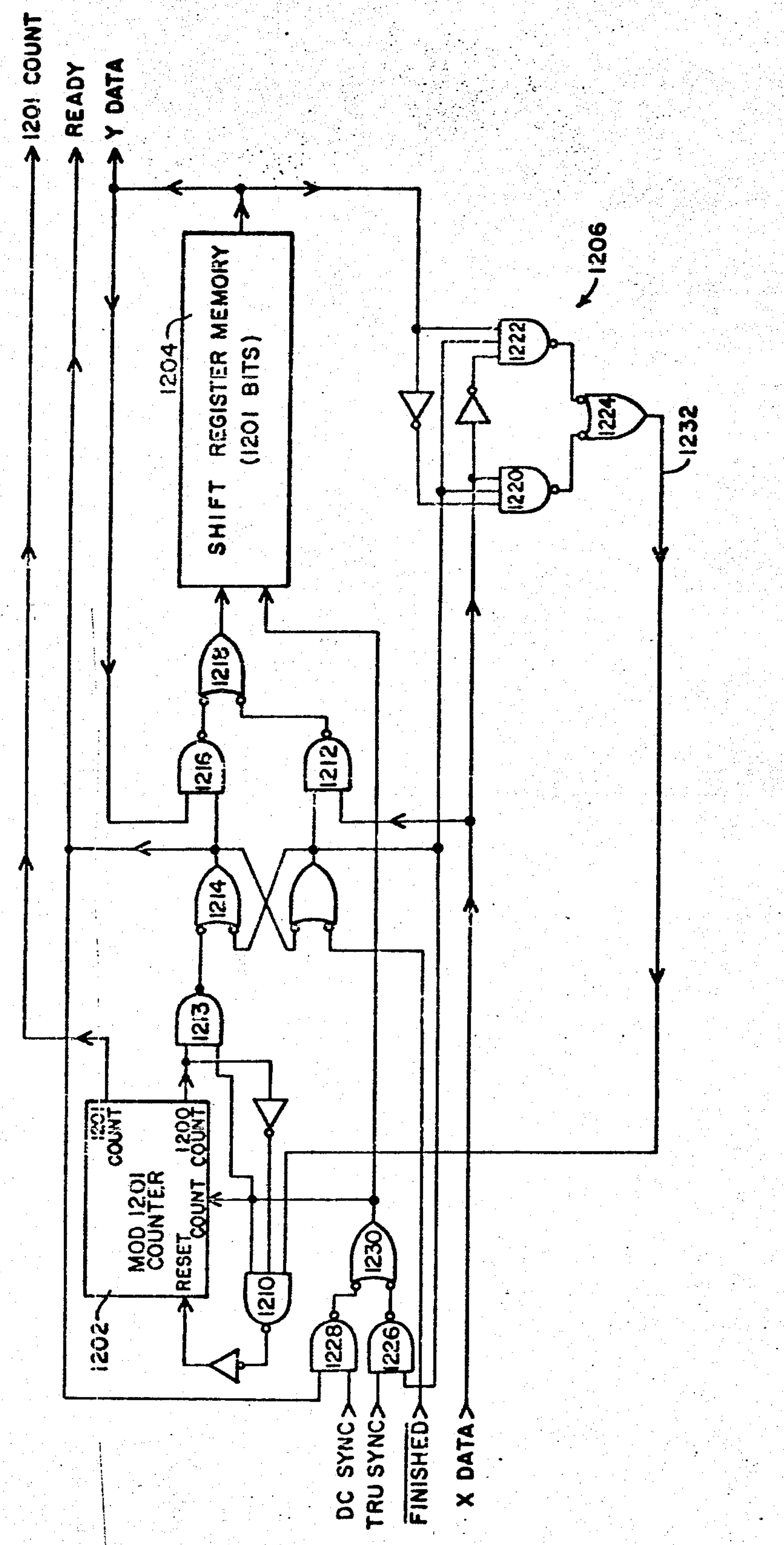

FIG. 3 FM MESSAGE GENERATION
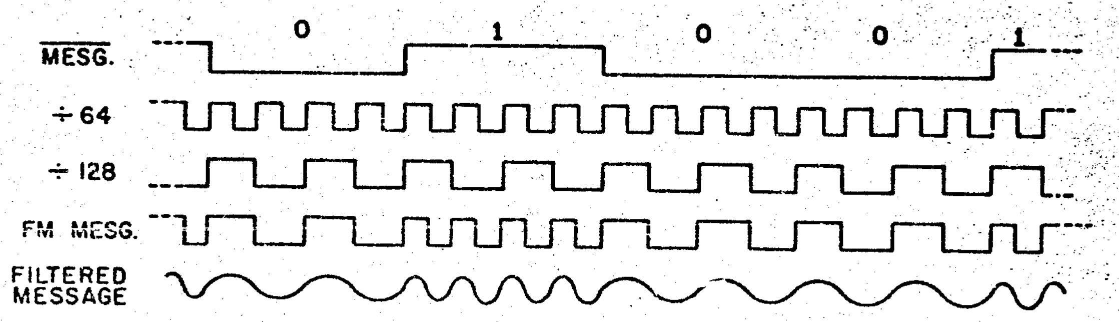
FIG. 4 NORMAL 30 SECOND COMPARISON TIMING DIAGRAM
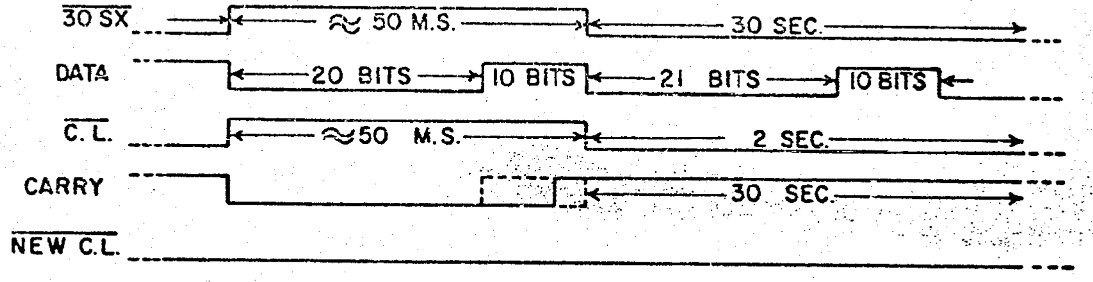
FIG. 5 NEW CHANGE LINE DUE TO TIME TURNOVER
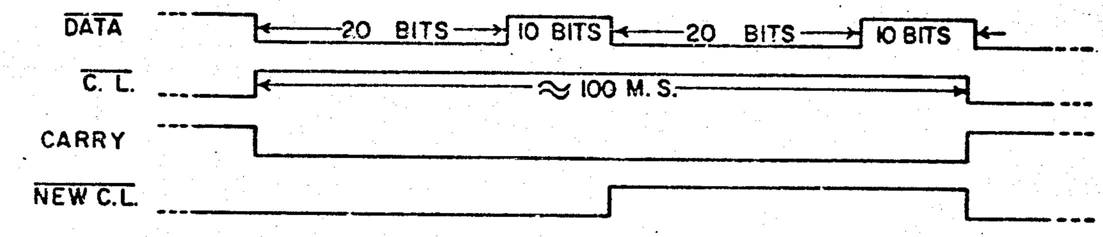
FIG. 6 NEW CHANGE LINE DUE TO NEW DATA
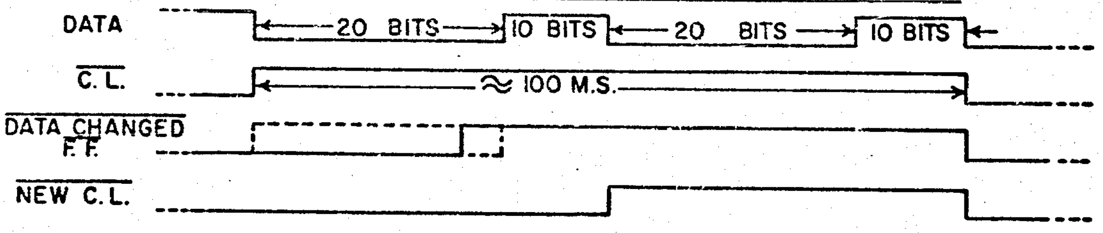
FIG. 7 DATA TRANSMISSION ORDER
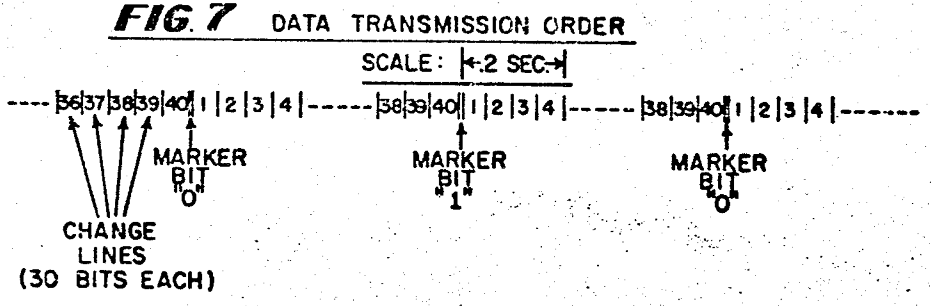

DATA INTERFACE UNIT FOR INSURING THE ERROR FREE TRANSMISSION OF FIXED-LENGTH DATA SETS WHICH ARE TRANSMITTED REPEATEDLY

CROSS-REFERENCE TO RELATED APPLICATION

The present application is a divsion of application Ser. No. 15,696 filed on Mar. 2, 1970 which issued as U.S. Pat. No. 3,651,471 on Mar. 21, 1972.

BACKGROUND OF THE INVENTION

The present invention relates to data transmission systems and more particularly to a system which can transmit data from a plurality of remote locations to a central location. The present invention is particularly suitable for use as a television receiver monitoring system for collecting data as to the viewing habits of television viewers and for transmitting this data to a central location for statistical compilation.

In the past it has been customary to provide an arrangement which checks the status of each monitored television receiver about once every five minutes via telephone or via rented telegraph lines. Such arrangements use up a tremendous amount of telephone or telegraph time and thus are quite costly to operate. When the tuning of the home receivers does not change over an extended period, such arrangements collect a tremendous amount of duplicate data and, therefore, consume large amounts of telephone or telegraph time in merely checking to see if any monitored receiver has changed its status. Since sampling is performed only once every five minutes, such arrangements can miss short viewing intervals of five minutes or less and often cannot distinghish an extremely brief viewing interval from viewing intervals five minutes or more in length.

Attempts to provide improved data collecting arrangements have heretofore been largely unsuccessful. Some workers have attempted to provide systems which record the status of a television receiver on magnetic tape several times a minute with the tape being played back upon command from a central location at periodic intervals, say once a day or once a week. Such systems have generally proved unsatisfactory because of the expense and complication of providing a remotely controllable magnetic tape recording and playback mechanism. Magnetic tape would necessarily have to be used by such a system, since no other storage medium could hold the huge amount of data that would be generated by such a system. The chances of data errors in such a system are fairly great, since large amounts of data are first stored on tape and are then transferred over noisy telephone lines to a central station.

SUMMARY OF THE INVENTION

A primary object of the present invention is to provide a data transmission system that can transmit recorded data rapidly and accurately over conventional telephone lines.

Another object of the present invention is to design such a system which includes only circuits of minimum complexity.

A further object of the present invention is to design a system in which checks for transmission errors may be easily carried out and in which repeat transmissions are automatically executed if any transmission errors are found.

In accordance with these and other objects, the preferred embodiment of the present invention is embodied in a data interface unit which is used to collect and to error-check data that is periodically transmitted at a uniform rate from a remote location over telephone lines in the form of a binary coded signal. In the preferred embodiment of the invention, the data which is transmitted relates to the tuning and on-off status of television receivers located at the remote location; however, any other type of data may be transmitted using the same or a similar arrangement.

The data which is to be transmitted is repeatedly presented at a fixed rate in a form suitable for transmission — for example, as a frequency modulated signal. One bit of the data, called the marker bit, is reversed in sign after each data transmission so that some indication is given of where each transmitted data set begins and ends.

In accordance with the present invention, a data interface unit is provided at the central location into which the repeatedly transmitted data signals are fed. The data interface unit stores a complete set of the transmitted data and then compares the data set bit-by-bit with the next transmission of the same data set. Since initially the data interface unit has no knowledge of the location of the marker bit or of the beginning of the transmitted data, this comparison procedure is carried out until a first bit in the later transmission is found which does not agree with a bit in the earlier transmission. That bit is then assumed to be the marker bit. The comparison procedure is then continued until all of the data bits comprising the first transmission have been compared to all the data bits comprising the second transmission. If only the marker bit differs in sign, then it may be assumed that the transmission is error-free. Hence, either the data stored within the interface unit or the subsequently received data may be transmitted on for processing by a digital computer or other suitable apparatus. However, if two or more data bits have reversed their sign between successive transmissions, then either an error has occurred or the data which is transmitted has been updated between transmissions. In any event, the data interface unit then rejects the transmitted data and begins the comparison procedure anew. This comparison procedure is continuously carried out until finally two complete data sets are received which differ from one another by only the change in the status of the marker bit.

In the preferred embodiment of the invention, the incoming data signal is stored in a shift-register memory having sufficient capacity to hold a complete transmission of the data. A counter is arranged to count the data bits which are loaded into the memory and a comparator is arranged to clear the counter to zero count whenever the data which flows from the memory disagrees with the incoming data. This counter is continuoulsy cleared so long as the data bits flowing out of the memory do not relate to the new data bits flowing into the memory. As soon as the memory output data begins to agree with the incoming data, as when two identical data sets are received in sequence, the counter begins to count the data bits which flow into the memory. This counting procedure continues until the marker bit flows from the memory, at which time the counter is cleared to zero count. If a complete, error-free transmission of the data set is then received, and if the data set stored within the memory is also free of errors, then the counter counts from zero up to a number corresponding to the number of bits in the message and signals that the memory contains an error-free data set with the marker bit positioned at the memory output. The counter may also signal to a digital computer that the data set is ready to be loaded into the computer. However, if any other bit within the memory disagrees with a subsequently received bit in the same position within the data set, the comparator resets the counter to zero count and causes the procedure to begin anew.

The present invention is especially suited for use in situations when data is gathered by telephone. The data presented at remote locations may be continuously retrieved from a circulating memory and presented in a form suitable for transmission over telephone lines. Equipment at a central location may then simply place a call to a remote location and "listen in" to the continuously presented data at the remote location. All that is needed at the remote location to establish the telephone connection is a simple ring-responsive relay that is arranged to establish momentary contact between the remote data source and the telephone line. The phone connection may be established for 30 seconds, more than enough time for the central location to receive a number of complete data set transmissions and to carry out any data checking that is required. If the first two transmissions are error free, the central location may then cut off the telephone connection and proceed to make another call, even though equipment at the remote location may remain off-hook for a short length of time thereafter.

Other objects and advantages of the present invention are apparent in the detailed description which follows, and the features of novelty which characterize the invention are pointed out with particularity in the claims annexed to and forming a part of the specification.

BRIEF DESCRIPTION OF THE DRAWINGS

For a further understanding of the present invention, reference will be made to the drawings wherein:

FIG. 1 is a block diagram of a data storage and transmission system designed in accordance with the present invention;

FIG. 2 is a logical representation of the data interface unit used in the data storage and transmission system shown in FIG. 1; system shown in FIG. 1;

FIG. 3 is a timing diagram illustrating the various waveforms which are used to construct the FM MESG signal shown in FIg. 1;

FIG. 4 is a timing diagram of waveforms which occur within the data handling system shown in FIG. 1 once every 30 seconds;

FIG. 5 is a timing diagram of waveforms which occur when a new change line is fed into the memory of the data handling system shown in FIG. 1, due to time turnover;

FIG. 6 is a timing diagram of waveforms which occur when a new change line is fed into the memory of the data handling system shown in FIG. 1, due to a change in the data presented by the monitored receivers; and FIG. 7 is a timing diagram illustrating the order in which change line data sets are transmitted from the data handling system shown in FIG. 1 and illustrating the placement and polarity reversals of the marker bit.

DESCRIPTION OF THE PREFERRED EMBODIMENT

A complete description of the data storage and transmission system shown in FIG. 1 is to be found in application Ser. No. 15,696 filed on Mar. 2, 1970 now U.S. Pat. No. 3,651,471. The specification and the drawings of that application are hereby incorporated by reference into the present application for all purposes.

Referring now to the drawings, FIG. 1 shows a block diagram of a data storage and transmission system designed in accordance with the present invention and indicated generally by the reference numeral 20. The system 20 includes basically a central unit 44 connected by the telephone direct distance dialing network to a plurality of remote units such as the typical remote unit 42. The remote unit 42 includes anywhere from one to four monitored television receivers 22, 24, 26, and 28 each of which supplies five bits of tuning condition and on-or-off status data to a data handling system 200. The data handling system 200 generates an FM MESG (frequency modulated message) signal. This FM MESG signal contains data characterizing the tuning condition and on-or-off status of the monitored receivers both currently and in the recent past. The FM MESG signal is continuously fed to a telephone transmitting unit 34 for transmission to the central unit 44.

The data handling system 200 includes a 1201 bit circulating memory with sufficient capacity to store 40 30-bit change lines and one marker bit. Each change line includes a 20-bit data portion and a 10-bit time portion. The data portion contains four 5-bit numbers which characterize the tuning condition and the on-or-off status of the four monitored television receivers during some specific time interval, and the time portion contains a binary number which specifies the duration of the specific time interval. As the memory circulates, its contents are continuously presented as the FM MESG signal. The marker bit is reversed in sign each time the memory circulates.

The telephone transmitting unit 34 is a conventional telephone signal transmission unit which goes "off hook" for a period of 30 seconds or so in response to a ringing signal, and which then transmits the FM MESG signal and also a POWER OFF tone directly to the central unit 44 via the direct distance dialing network. Since the unit 34 does not have to receive any data from the central unit 44 other than the ringing signal which places it "off hook", the unit 34 can be extremely simple. Such units are widely used in systems which transmit a brief recorded message in response to a ringing signal, and therefore no detailed description of the unit 34 is included with this specification. Other than the ringing signal, no signals need to flow from the central unit 44 to the remote unit 42. This greatly simplifies the problems of system design and coordination and makes it impossible for any data to be lost if another telephone accidentally makes contact with the remote unit 42.

Power for the data handling system 200 and for the telephone transmitting unit 34 comes from batteries 31 which are trickle charged by a power supply 30 connected to a 120 volt A. C. source of potential. Electrical power interruptions in the 120 volt A. C. source are detected by a power interrupt detector 32 which generates a 367 cycle POWER OFF tone whenever an interruption occurs. This POWER OFF tone is fed directly to the telephone transmitting unit 34 for transmission to the central unit 44.

The central unit 44 includes a conventional digital computer 40 and a conventional telephone receiving unit 36. The computer 40 is connected to the receiving unit 36 by a data interface unit 1200 and a data synchronizing unit 2000 and also by a conventional automatic dialer 38. When data is to be transmitted to the central unit 44 from a remote unit, the digital computer 40 generates dialing signals which are supplied to the automatic dialer 38. The automatic dialer 38 generates the necessary "touch tones" to establish a telephone connection between the telephone receiving unit 36 and a remote telephone transmitting unit, for example the unit 34. The transmitting unit 34 then transmits to the telephone receiving unit 36 both the FM MESG signal and the POWER OFF tone signal. The telephone receiving unit 36 translates the POWER OFF tone signal into a digital POWER OFF signal which is fed directly to the digital computer 40. It also translates the FM MESG signal into a digital RCVD. DATA signal which is fed to the data synchronizing unit 2000 and generates a CARRIER PRESENT signal whenever the FM MESG signal carrier is being received. In the preferred embodiment, the unit 36 is a DATAPHONE (registered trademark) telephone receiving unit model 202C manufactured by Western Electric Company, Incorporated.

The data synchronizing unit 2000 converts the relatively unstable RCVD. DATA signal into a precisely formed X DATA signal. The unit 2000 also generates TRU SYNC (telephone receiving unit sync) pulses which strobe the X DATA signal into the data interface unit 1200. The CARRIER PRESENT signal is also used by the unit 2000 to reduce the time which it takes for the unit 2000 to lock into phase synchronization with the data bits comprising the RCVD. DATA signal. The unit 2000 is largely responsible for the high degree of accuracy of the data transmission portions of the present invention.

The X DATA signal can be fed directly into the digital computer 40, and then the computer 40 can be used to analyze the X DATA signal to determine the location of the various transmitted data sets. This would be inefficient, however, since the transmission rate of the X DATA signal is very slow in comparison to the rate at which the computer 40 can work. Therefore, a data interference unit 1200 is used to store the X DATA signal, to check it for transmission errors, and to then present it at high speed to the digital computer 40 in the form of a Y DATA signal. The data interface unit 1200 continuously monitors the X DATA signal until it has twice accurately received the 1201 data bits transmitted by the remote unit 42. Every bit, excepting the marker bit, must be identically received twice in succession before one of the recorded sets of 1201 bits is presented to the digital computer 40. This error-checking procedure can be completed in four seconds, but it may take much longer if transmission errors are encountered. If the procedure lasts for more than thirty seconds, the transmitting unit 34 may go off hook before the transmitted data is accurately received. If this happens, the remote unit 42 is contacted a second time, and the entire procedure is repeated.

When the unit 1200 has accurately received the transmitted data, it generates a READY signal. This signal initiates an interrupt of the digital computer 40. The computer 40 then receives one set of data from the data interface unit 1200 in the form of a Y DATA signal. In the embodiment shown, the Y DATA signal presents one data bit each time the data interface unit 1200 receives a D. C. SYNC (digital computer synchronization) signal from the computer 40. Hence, the transfer of data into the computer 40 is performed at whatever speed is most suitable for the computer 40. Alternatively, the bits comprising the Y DATA signal can be presented to the digital computer 40 in parallel rather than serially. When the computer 40 has received and stored the Y DATA signal, it generates a FINISHED signal which prepares the data interface unit 1200 for reception of the next transmission.

The transmitted data is now sorted by the digital computer 40 and is added to the statistical base from which viewer preference for TV programs is extracted. The particular manner whereby statistical data and ratings are compiled is beyond the scope of this application and is not discussed here in detail.

Each 30-bit change line contains two portions. A first portion is called the data portion. The data portion contains 20 data bits, five of which are allotted to each of the four monitored television receivers. A second portion is called the time portion. The time portion contains 10 data bits all of which are used to store a binary number that specifies the number of 30-second intervals which elapse between the times when successive change lines are recorded. A DATA signal in each data handling system 200 indicates whether the time or data portion of a change line is flowing from the memory. When the DATA signal is present (negative), the data portion of a change line is flowing from the memory. When the DATA signal is absent (positive), the time portion of a change line is flowing from the memory. When the most recently recorded or "current" change line and the marker bit flow from the memory, a C.L. (current change line) signal is present (negative).

As the memory within each system 200 continuously circulates its data, the memory output signal is fed continuously into an FM message generator (not shown). The generator translates the memory data bits into an FM MESG (frequency modulated message) signal that is suitable for telephone transmission. FIG. 7 shows the exact order in which data is transmitted. The change lines are transmitted serially starting with the first change line (the oldest in time) and ending with the 40th or current change line (the newest in time). Each change line takes about 50 milliseconds to transmit, so the entire set of 40 change lines can be transmitted in about 2 seconds. Between each transmission of the 40 change lines, the marker bit or 1201st bit is transmitted. As shown in FIG. 7, the polarity or sign of the marker bit is reversed after each transmission. If the marker bit is a 0 during a given transmission, during the next transmission it is a 1; during the next a 0; and so on. The memory bit always comes after the fortieth or current change line and just before the first change line. The memory and the FM message generator operate continually, and thus the FM MESG signal is always present, ready for transmission at any time.

FIG. 3 shows the manner whereby a frequency modulated message is generated by the data handling systems 200. Two tone signals, a divde by 64 signal and a divide by 128 signal, are presented to an FM message generator (not shown). The generator 1000 generates an output signal called the FM MESG (frequency modulated message) signal. The FM MESG signal is identical to one or the other of the two tone signals, depending upon which polarity bit flows from the memory. If a zero bit appears, the FM MESG signal is identical to the divide by 128 signal, whereas if a 1 bit appears, it is identical to the divide by 64 signal. After passage through the telephone system or after filtering, the FM MESG signal looses its higher harmonics and becomes the signal labelled "FILTERED MESSAGE," shown at the bottom of FIG. 3. This FILTERED MESSAGE signal is a frequency modulated sinusoid of a type that can be handled by standard telephone frequency modulation reception equipment. The divide by 64 signal, the divide by 128 signal, and the MESG data signal are chosen to fluctuate at such a speed that data is transmitted at only half the maximum possible telephone data transmission rate. Hence, at least two full cycles of sinusoid are used to represent each bit. This insures a high degree of accuracy in data transmission.

FIGS. 4, 5, and 6 show precisely what happens every thirty seconds when a 30 SX signal initiates a comparison of the data portion of the current change line and the contents of a TV data register (not shown).

FIG. 4 illustrates what normally happens when the condition and status of the monitored receivers have not changed and when the capacity of the current change line time portion has not been exceeded. The 30 SX signal commences simultaneously with the commencement of the C.L. signal, the DATA signal, and a CARRY signal. During the period when the DATA signal is present (negative), a comparison gate (not shown) determines that no changes have occurred in the status of the monitored receivers. Later when the DATA signal is absent (positive), a carry flip-flop (not shown) and memory data gates (not shown) increment by one the number within the ten-bit time portion of the current change line. At some point the carry flip-flop clears so that the CARRY signal terminates (goes positive) before the DATA signal recommences (goes negative). This indicates that the capacity of the time portion of the current change line has not yet been exceeded. At the end of the 50 millisecond long C.L. time interval, the J input to a new change line flip-flop (not shown) is at a low level. When the DATA signal again commences, the new change line flip-flop is not toggled, and a NEW C.L. (new change line) signal never commences. Hence, no new change line is loaded into the system 200.

FIG. 5 shows the sequence of signals which occur when a new current change line is created by passage of time causing the capacity of the current change line time portion to be exceeded. When this happens, the CARRY signal which commences simultaneously with the DATA signal stays present (negative) through an entire cycle of the DATA signal. The CARRY signal passes through to the J input of the new change line flip-flop (not shown) and is still present when the DATA signal commences a second time. Therefore, the leading edge of the DATA signal toggles the flip-flop and initiates the creation of a new current change line. The C.L. pulse interval in FIG. 5 is approximately 100 milliseconds long, twice as long as it was in FIG. 4. During the second half of this extended C.L. pulse, the oldest change line and the marker bit are discarded, and a new current change line and marker bit are fed into the memory. The NEW C.L. (new change line) signal is present during the latter half of this extended C.L. pulse interval.

FIG. 6 shows the sequence of signals which occur when a new current change line is created due to a change in the condition or status of the monitored television receivers. Sometime during the brief time interval when the data portion of the current change line is compared with the contents of a TV data register (not shown), a data changed flip-flop (not shown) is set by a pulse generated by the comparison gate. The data changed flip-flop generates a signal which flows into the J input of the new change line flip-flop, so that the flip-flop is toggled by the second commencement of the DATA signal. This initiates the NEW C.L. signal and the creation of a new change line. The C.L. pulse again is extended to twice its normal length so as to encompass both the old and the new current change lines.

Operation of each data handling system 200 is controlled by a high frequency crystal clock. This clock drives a series of serially connected frequency dividing counters. The clock is crystal stabilized so as to generate 2,459,648 million pulses per second. This pulse rate causes 30 SX pulses spaced almost exactly 30 seconds apart to appear at the output of the last counter in the chain.

In the preferred embodiment of the present invention the unit 1200 is constructed using resistor-transistor integrated logic circuitry (RTL). This particular line of logic circuitry includes one basic gate configuration which can be used as a NAND logic element, as a NOR logic element, and as an inverting or NOT logic element. The basic feature of the RTL logic gate is that its output goes positive only when all of its inputs are at ground level. An example of such a gate used as a NAND gate is a gate 1228 shown in FIG. 2. An example of such a gate used as a NOR gate is a gate 1230 shown in FIG. 2. Examples of such gates used as inverting or NOT gates are the un-numbered triangular gates shown in FIG. 2.

Throughout the remainder of this specification only rarely will any mention be made of whether a signal is at a high level, at ground level, or inverted. For the most part, only the presence or absence of a signal will be mentioned. FIG. 2 clearly indicates all inverted signals either by overlining of the signal name or by separation of the signal line from adjacent gates with inverting circles. Thus, for example, the DCSYNC and the READY signals are non-inverted, while the FINISHED signal is inverted. Whenever a signal is said to be present, the associated signal line is at ground level if the signal is not inverted, or is positive if the signal is inverted. Similarly, whenever a signal is said to be absent, the associated signal line is positive if the signal is not inverted, and is at ground level if the signal is inverted.

Referring now to FIG. 2, the interface unit 1200 includes four basic elements. It includes a 1201 bit shift register memory 1204, a digital comparator 1206, a mod 1201 counter 1202, and a bistable circuit 1214 which functions as a data routing switch. Assume the unit 1200 is in operation and is receiving both the X DATA signal and also the TRU SYNC (telephone receiving unit sync) pulses from the data synchronizing unit 2000 (FIGS. 1 and 2). Assume also that initially the bistable 1214 is in such a state that it enables the gates 1212, 1220, 1222, and 1226, and simultaneously disables the gates 1216 and 1228. The X DATA signal then passes freely through the two gates 1212 and 1218 and into the shift register memory 1204. The TRU SYNC pulses flow through the gates 1226 and 1230 to the shift terminal input of the shift register memory 1204 and also to the count terminal of the mod 1201 counter. Hence, the X DATA signal is continuously loaded into the shift register memory 1204, and the mod 1201 counter 1202 is continuously advanced one count with each bit that is read into the memory 1204. Data continuously flows out of the shift register memory 1204 in form of the Y DATA signal. This Y DATA signal is continuously compared with X DATA signal by the digital comparator 1206. The comparator 1206 comprises the three gates 1220, 1222, and 1224. The comparator 1206 is connected in such a manner that an output signal appears and is supplied to a line 1232 whenever the X DATA signal and the Y DATA signal are not identical. This signal enables the gate 1210 to pass a TRU SYNC pulse to the reset terminal of the mod 1201 counter 1202. Hence, whenever the X DATA signal disagrees with the Y DATA signal, the counter 1202 is reset to zero count.

Initially, the data flowing from the memory 1204 bears no relation to the X DATA signal, and hence the counter 1204 is reset randomly approximately every other time a data bit flows from the memory 1204. After 1201 bits of the FM MESG signal have been loaded into the memory 1204, however, the Y DATA signal and the X DATA signal begin to agree with one another. This is because the FM MESG signal comprises 1201 bits that are repeated over and over again. Since the two signals agree, the counter 1202 now begins to count upwards. The count continues until the marker bit appears in the Y DATA signal. It will be remembered that the marker bit is reversed in sign or polarity each time it is transmitted (see FIG. 7). Hence, the next marker bit presented to the comparator 1206 by the X DATA signal is of opposite sign from the marker bit presented by the Y DATA signal. This causes a signal to appear upon the line 1232 which resets the counter 1202 to zero count. The counter 1202 now begins to count successful comparisons between the next 1200 bits of data presented by the memory 1204 and the incoming X DATA signal. If no transmission errors occur, these two signals are identical to one another, and the counter 1202 counts up to 1200 without resetting. If any transmission errors occur, one or more bits of data presented to the comparator 1206 by the memory 1204 do not agree with the corresponding bits presented by the X DATA signal, and the counter 1202 resets to zero before a count of 1200 is reached. The counter 1202 is thus prevented from reaching a count of 1200 unti all 1200 bits of change line data have been received twice without any transmission errors.

When the counter 1202 finally reaches a count of 1200, it generates a 1200 COUNT signal which enables the gate 1213 and disables the reset gate 1210. The next TRU SYNC pulse passes through the gate 1213 and changes the state of the bistable circuit 1214. The bistable circuit 1214 then disables the gates 1212, 1220, 1222, and 1226, and simultaneously enables the gates 1216 and 1228. An output signal from the bistable 1214 is simultaneously presented in the digital computer 40 in the form of a READY signal which indicates that the data within the interface unit 1200 is ready for transmission to the digital computer 40. The READY signal initiates an interrupt within the digital computer 40. The gate 1226 is now disabled, so the TRU SYNC pulses are no longer allowed to advance data out of the shift register memory 1204. Instead, the gate 1228 enables both the shift register 1204 and the counter 1202 to be supplied with DC SYNC (digital computer synchronizing) pulses generated by the digital computer 40. The DC SYNC signal presents shift pulses at a much higher rate of speed than the TRU SYNC signal because the digital computer 40 can receive data at a much higher rate of speed than can the telephone receiving unit 36 (FIG. 1). The DC SYNC shift pulses simultaneously advance data out of the shift register memory 1204 in the form of the Y DATA signal and advance the counter 1202. The Y DATA signal is recirculated back into the memory 1204 through the gates 1216 and 1218, so the memory 1204 now recirculates freely. The counter 1202 counts as the memory 1204 recirculates and generates a 1201 COUNT signal each time it reaches a count of 1201. Since the counter 1202 was initially set to zero count when the marker bit first appeared in the Y DATA signal, and since it counts synchronously with the shifting of data through the memory 1204, the 1201 COUNT signal appears each time the marker bit appears in the Y DATA signal. Hence, the digital computer 40 is continuously presented with the entire 1201-bit transmitted data set in the form of the Y DATA signal, and also with a 1201 COUNT synchronizing pulse that tells exactly when the marker bit is presented by the Y DATA signal. The digital computer 40 then simply counts out 30-bit data groups following the occurrence of the 1201 COUNT signal, and thus easily separates the various change lines from one another. When the digital computer 40 has completed the task of data reception, it generates a FINISHED signal which toggles the bistable circuit 1214 and prepares the unit 1200 for reception of the next transmission.

If greater accuracy is desired, the above error-checking procedure can be modified so that an additional comparison to a third transmission is carried out. A check can then be made to see if the bit having reversed sign has changed its location. Additional comparisons beyond three are generally not advisable because of the amount of telephone connect time required, and also because of the greatly increased probability of encountering a transmission error.

As noted at the beginning of this specification, the data interface unit 1200 is not essential and the error-checking procedure can be performed by the digital computer 40 or by a special data interface computer. Care must be taken to insure that this computer does not miss data bits presented by the X DATA signal. If the computer is handling several tasks on a priority interrupt basis, some means for indicating when the computer misses a data bit should be provided. A suitable circuit for giving this indication and for initiating a computer interrupt is described in application Ser. No. 15,696 filed on Mar. 2, 1970 now U.S. Pat. No. 3,651,471 The computer is preferably programmed in machine or assembly language rather than in compiler language so that unnecessary and time consuming steps are avoided whenever possible. Alternatively, a high speed computer can be used.

A suitable error-checking program for the computer 40 has been written. This program reads 1201 data bits into the computer 40 from the X DATA signal and stores these bits in a linear array. One bit is read into the computer 40 each time the data synchronizing unit 2000 (FIG. 1) generates an SIR (signal is ready) signal, and the SIR signal is terminated by a computer generated WR 1 signal after each bit is read into the computer. If the synchronizing unit 2000 presents a second bit before the WR 1 signal has been generated and terminated, the synchronizer 2000 generates an OVR (overrun) signal. The OVR signal indicates that a data bit has probably been lost. In response to the OVR signal the computer 40 begins the error-checking procedure from the start, discarding all data received previously.

When 1201 bits have been stored in the linear array, the next 1201 bits of data are sequentially compared to the first 1201 bits. When a first bit is received that disagrees in sign with the corresponding bit in the linear array, the array location of this bit is recorded. The comparison procedure is then continued. When a second bit is received that disagrees with the corresponding bit in the linear array, the array location of this second bit is compared to the array location of the first bit. If the two locations agree, then all three of the disagreeing bits are assumed to be marker bits and the transmission is assumed to have been received without error. If the two locations do not agree, then one or the other of the bits has been reversed in sign due to a transmission error. In this case, the computer 40 recommences the data reception and error-checking procedure from the start.

Throughout the error-checking procedure it is advisable to have the computer check for the continued presence of the CARRIER PRESENT signal generated by the telephone receiving unit. In addition, the computer can periodically check a clock to insure that transmission does not last longer than the maximum time during which the transmitting unit 34 (FIG. 1) can transmit. Other error checks can also be made by the computer 40 to insure that the dialer and receiving unit are functioning properly.

If a greater degree of accuracy is required, additional comparisons can be carried out to additional transmissions. As mentioned above, these additional comparisons require additional telephone connect time and additional computer time. Therefore, two or three comparisons are considered sufficient for most applications. The chances of encountering a transmission error are increased in proportion to the number of comparisons performed.

Although the present invention has been described with reference to an illustrative embodiment thereof, it should be understood that numerous other modifications and changes will readily occur to those skilled in the art and it is therefore intended by the appended claims to cover all such modifications and changes that will fall within the true spirit and sope of the invention.

What is claimed as new and desired to be secured by Letters Patent of the United States is:

1. A data interface unit for error checking and organizing a signal that is transmitted repetitively, said data interface unit comprising:

a serial memory with the capacity to store an entire transmission of the signal, said memory having an input into which the signal is fed and having an output;

a counter;

means for advancing said counter in synchronism with the flow of data bits into the serial memory;

a comparator having two inputs, one connected to the serial memory output and the other receiving the incoming signal, and having an output connected to said counter for resetting said counter whenever the two inputs do not match; and means connecting to said counter and responsive to said counter reaching a predetermined count for signalling that the serial memory contains an organized, error-free data set.

2. A data interface unit in accordance with claim 1 wherein the signalling means comprises a bistable circuit which changes its state when the counter reaches the predetermined count, said bistable circuit generating a ready signal, and wherein the data interface unit includes recirculation gates connecting the memory output to the memory input and enabled by the ready signal.

3. A machine-implemented method for performing error checks upon and for locating the first data bit in a multi-bit data set that is continuously and repeatedly transmitted as a signal and that contains one data bit whose sign is reversed between successive transmissions, said method comprising the steps of:

recovering from said signal a first group of sequentially-transmitted data bits equal in number to the number of bits in the multi-bit data set;

recovering from said signal a second group of sequentially-transmitted data bits equal in number to the number of bits in the multi-bit data set and appearing in said signal immediately following the appearance of said first group of data bits within said signal;

comparing each data bit in said first group with a correspondingly-positioned data bit in said second group;

preserving a record of the group-relative location of the first data bit in the first group which disagrees with its counterpart in the second group;

presenting either group as an accurate transmission of the data set and presenting said record as an indicator of where within the group the first data bit in the data set is located, but only if no more than one data bit is found in the first group which disagrees with its counterpart in the second group; and repeating all of the above steps using different first and second groups as many times as is necessary to locate a pair of groups in which only one data bit in the first group disagrees with its counterpart in the second group.

* * * * *